(12) United States Patent
Kristoffersen (10) Patent No.: US 9,645,583 B2
(45) Date of Patent: May 9, 2017

(54) BALANCED FLUID VALVE (71) Applicant: Isomatic A/S, Randers (DK)

(72) Inventor: Soeren Kristoffersen, Hadsund (DK)

(73) Assignee: Isomatic A/S, Randers (DK)

( * ) Notice: Subject to any disclaimer, the term of this patent is extended or adjusted under 35 U.S.C. 154(b) by 0 days.

(21) Appl. No.: 14/464,287

(22) Filed: Aug. 20, 2014

(65) Prior Publication Data
US 2014/0352814 A1    Dec. 4, 2014

Related U.S. Application Data (62) Division of application No. 13/119,580, filed as application No. PCT/DK2009/000205 on Sep. 17, 2009, now abandoned.

(30) Foreign Application Priority Data

Sep. 19, 2008   (EP) ..................................... 08016556

(51) Int. Cl.
    *G05D 16/10* (2006.01)
    *G05D 7/01* (2006.01)
    *G05D 7/00* (2006.01)

(52) U.S. Cl.
    CPC ........... *G05D 7/0133* (2013.01); *G05D 7/005* (2013.01); *G05D 16/106* (2013.01);
(Continued)

(58) Field of Classification Search
    CPC ..... F16K 1/307; F16K 31/1221; G05D 16/10; G05D 16/103; G05D 16/106; Y10T 137/7796; Y10T 137/7797; Y10T 137/7798; Y10T 137/7808; Y10T 137/7801
(Continued)

(56) References Cited

U.S. PATENT DOCUMENTS

| | | | | |
|---|---|---|---|---|
| 1,923,595 A | * | 8/1933 | Temple ................ | G05D 7/0193 137/501 |
| 2,731,034 A | * | 1/1956 | Dinkelkamp ............ | F16N 5/00 137/495 |

(Continued)

FOREIGN PATENT DOCUMENTS

| | | |
|---|---|---|
| CN | 1074520 A | 7/1993 |
| CN | 2146619 Y | 11/1993 |

(Continued)

OTHER PUBLICATIONS

Communication Pursuant to Article 94(3) EPC for Application No. 08016556.6-1801 dated Mar. 14, 2014.
(Continued)

*Primary Examiner* — William McCalister
(74) *Attorney, Agent, or Firm* — McCormick, Paulding & Huber LLP (57) ABSTRACT

It is proposed to design a fluid flux regulating unit, comprising a first fluid port, a second fluid port and a valve comprising a movable valve part and at least one fluid pressure balancing means, wherein the fluid pressure balancing means comprises a surface in fluid communication with the first fluid port, which has a surface normal vector at least partially in parallel to the moving direction of the movable valve part.

6 Claims, 7 Drawing Sheets

(52) U.S. Cl.
CPC .... *Y10T 137/7793* (2015.04); *Y10T 137/7796* (2015.04); *Y10T 137/7797* (2015.04); *Y10T 137/7798* (2015.04); *Y10T 137/7801* (2015.04); *Y10T 137/7808* (2015.04)

(58) Field of Classification Search
USPC ............ 137/505.13, 505.14, 505.15, 505.18, 137/505.25
See application file for complete search history.

(56) References Cited

U.S. PATENT DOCUMENTS

| | | | |
|---|---|---|---|
| 3,437,109 A | | 4/1969 | Carlson et al. |
| 3,576,193 A | * | 4/1971 | Rothfuss ............ G05D 16/0663 137/116.5 |
| 3,890,999 A | | 6/1975 | Moskow |
| 6,079,434 A | * | 6/2000 | Reid .................. G05D 16/0655 137/14 |
| 7,048,001 B2 | | 5/2006 | Youngberg et al. |
| 2004/0261859 A1 | | 12/2004 | Callies |
| 2007/0209703 A1 | * | 9/2007 | Neumann ............ G05D 16/106 137/102 |

FOREIGN PATENT DOCUMENTS

| | | |
|---|---|---|
| EP | 0081229 A2 | 6/1983 |
| FR | 1324371 A | 4/1963 |
| FR | 2879721 A1 | 6/2006 |
| GB | 07271 | 0/1910 |
| GB | 732693 | 6/1955 |
| GB | 895517 | 5/1962 |

OTHER PUBLICATIONS

Communication Pursuant to Article 94(3) EPC for Application No. 08016555.8-1801 dated Mar. 14, 2014.

International Search Report for Application No. PCT/DK2009/000205 dated May 11, 2009.

International Search Report for Application No. PCT/DK2009/000208 dated May 11, 2009.

Australian Patent Examination Report No. 1 for Australian Patent Application No. 2009295048 dated Jan. 17, 2013.

Australian Patent Examination Report No. 2 for Australian Patent Application No. 2009295048 dated Jun. 25, 2013.

Australian Patent Examination Report No. 3 for Australian Patent Application No. 2009295048 dated Nov. 25, 2013.

Australian Patent Examination Report No. 4 for Australian Patent Application No. 2009295048 dated Mar. 11, 2014.

Australian Patent Examination Report No. 1 for Australian Patent Application No. 2009295049 dated Dec. 13, 2012.

\* cited by examiner

BALANCED FLUID VALVE

CROSS REFERENCE TO RELATED APPLICATIONS

This application is a divisional of U.S. patent application Ser. No. 13/119,580 filed Mar. 28, 2011, which is the National Stage of International Patent Application No. PCT/DK2009/000205 filed on Sep. 17, 2009, which claims priority to European Patent Application No. 08016556.6 filed on Sep. 19, 2008, the contents of which are incorporated by reference.

FIELD OF THE INVENTION

The invention relates to a fluid flux regulating unit, comprising a first fluid port, a second fluid port and a valve means.

BACKGROUND OF THE INVENTION

Fluid flux regulating units are used, when it comes to influencing the amount of fluid flow through a device and/or to influence the direction into which a fluid flow is directed. The influencing behaviour can be based on a variety of parameters, of course. For example, it is possible that a fluid flow is regulated in a way that the fluid pressure in a certain part of a machine is set to a certain pressure, in particular a constant pressure. In other cases, a simple opening and interruption of the fluid flow is intended. In yet other applications, an incoming fluid flow has to be selectively directed to a first fluid port, to a second fluid port or has to be split up into two parts, the respective part going to a first fluid port and to a second fluid port.

Fluid flux regulating units for performing these type of tasks are well known in the state of the art.

In U.S. Pat. No. 3,890,999 and in U.S. Pat. No. 2,777,458 fluid pressure regulators are described. These fluid pressure regulators have a fluid inlet port and a fluid outlet port. Fluid at a high pressure enters the pressure regulator through the fluid inlet port. Inside the fluid pressure regulator, the high fluid pressure is reduced to a lower set level. The fluid leaves the pressure regulator at reduced pressure through a fluid outlet port. For most applications, it is desired that the fluid outlet pressure is constant, independent on the fluid flux, passing through the fluid pressure regulator and in particular independent of the fluid pressure at the fluid inlet port.

Another problem is that fluid pressure regulators usually need a minimum outlet pressure to completely shut off. This is even true with a completely released pressure regulation spring device. Also, fluid pressure regulators according to the state of the art are usually ratio regulating devices, i.e. they are usually dependent on the inlet pressure, at least to a certain extent. Therefore, the diameter of the inlet orifice usually corresponds to the diameter of the fluid outlet, which in turn means that the regulator's output pressure will generally be affected by variations in the inlet pressure.

In EP 0 566 543 A1, DE 102 47 098 A1, U.S. Pat. No. 6,955,331 B2, U.S. Pat. No. 2,799,466, GB 846 106 and EP 1803 980 A1 actuated valves are described, where the fluid flow through the valve can be influenced by an external signal. The external signal can be applied as an external mechanical force (GB 846 106), as an electric signal (DE 102 47 098 A1, U.S. Pat. No. 2,799,466) or as a pilot pressure, applied to the valve (EP 0 566 543 A1, U.S. Pat. No. 6,955,331 B2, EP 1 803 980 A1). Even here it is desired that the signal to be applied to the actuated valve is essentially independent of other parameters, in particular independent of the fluid pressure on the high pressure side and/or on the low pressure side.

Although presently known fluid regulators and valves work quite well in practical applications, there is still room for further improvements. In particular, improvements are desired, when it comes to the independency of the respective device on the fluid pressure at the fluid inlet port and, where necessary, at the fluid outlet port.

SUMMARY OF THE INVENTION

The object of the invention is therefore to provide for a fluid flux regulating unit, showing an improved independency on fluid pressure.

It is suggested to design a fluid flux regulating unit, comprising a first fluid port, a second fluid port and a valve means in a way that said valve means comprises at least one fluid pressure balancing means. The fluid flux regulating unit is preferably designed in a way that said one or several fluid pressure balancing means provided are balancing the fluid flux regulating unit essentially completely. This essentially complete balancing can be provided in connection with the first fluid port, the second fluid port or both fluid ports. Each fluid pressure balancing means usually has the effect that the influence of the fluid pressure at the respective port on the valve means is reduced. This way, the fluid flux regulating unit can become essentially independent of the fluid pressure at the first fluid port, the second fluid port, or both.

Preferably, said valve means comprises at least one moveable valve part, wherein preferably said moveable valve part comprises at least one of said fluid pressure balancing means. Using such a movable valve part, the valve means can be designed in an easy and cost-effective way. The regulation of the fluid flow through the fluid flux regulating unit can be performed by a mechanical opening and closing of an opening, through which the fluid can flow. Furthermore, a leakage proof closing of the valve means can usually be easily achieved. However, pressure influences on the valve means usually stem from pressure influences on the movable valve part. Here, the imposed pressure can a create force, which in turn can lead to a movement of the movable valve part, thus creating an influence of the valve means on the applied fluid pressure. By providing said fluid pressure balancing means in connection with said movable valve part, the described effects can usually easily be accounted for and can be even avoided.

A preferred embodiment can be achieved if said valve member comprises an axially movable tubular unit, wherein preferably the tubular unit comprises an inner passage. Using this design, a fluid flux regulating unit can be provided in which a relatively small movement of the movable valve part can lead to a relatively large change in fluid flow cross section. By this, a wide range of fluid fluxes through the unit can be achieved. Furthermore, the tubular unit can be easily designed more elongated, so that it is easy to provide one or even a plurality of fluid pressure balancing means along the tubular unit. Another advantage of the proposed tubular shape of the movable valve part is that directional changes of the fluid, flowing through the fluid flux regulating unit, can be made relatively small. Hence, fluid flow resistance of the fluid flux regulating unit can be decreased. The movable valve part can be provided in connection with a valve seat, which can have an essentially even surface, in particular in connection with the plate like valve seat. Using such a valve seat, an essentially rotationally symmetric fluid flux regulating unit can be achieved, so that it is possible to even further reduce the fluid flow resistance of the fluid flux regulating unit.

Preferably, said fluid pressure balancing means is designed and arranged in a way that at least part of the surface parts, being in fluid communication with said first fluid port and having surface normal at least partially in parallel to the moving direction of said movable valve part, are fluid pressure balanced. Usually these surface parts are the surface parts, generating the largest influence on fluid pressure onto the opening and closing behaviour of the valve means of the fluid flux regulating unit. Therefore, by addressing the influence of these surface parts, the usually largest improvements can be achieved. The respective surface normal can be in parallel to the moving direction of the movable valve part, for example. However, it is also possible that the surface normal of the respective surface part is arranged at an angle with the moving direction of the movable valve part. The force, being generated by such an inclined surface, can be vectorially split up into a force, being parallel to the moving direction of the movable valve part and a force, being perpendicular to the moving direction of the movable valve part. However, usually only the force fraction, pointing in the direction of the moving direction of the movable valve part, will create a pressure influence on the fluid flux regulating unit. Therefore, addressing this force fraction will usually yield the biggest improvements.

It is possible that said fluid pressure balancing means is at least in part designed and arranged in a way that for each surface part, being in fluid communication with said first fluid port, a fluid pressure balancing surface is provided, being also in fluid communication with said first fluid port, wherein the fraction of the forces, generated by the fluid pressure on the first fluid port side and pointing into a direction parallel to the moving direction of said movable valve part, are opposing each other. This way, it is possible that by providing two (or more) forces of the same magnitude, but of different directions, the respective forces will cancel each other, so that the net force will be zero. Therefore, the fluid flux regulating unit can be designed in a way that the pressure dependency of the unit will be very small or even not existent. This, of course, is very advantageous. Usually, this can be done most effectively if the corresponding "balancing" surfaces are of the same size (considering the vectorial part with the surface normal parallel to the moving direction of the movable valve part).

Furthermore, it is possible to design the fluid flux regulating unit in a way that said fluid pressure balancing means is at least in part designed and arranged in a way that said movable part member essentially shows no surface parts, being in fluid communication with said first fluid port and having a surface normal at least partially in parallel to the moving direction of said movable valve part. This way the problem of fluid pressure dependency of the fluid flux regulating unit can be addressed at the very root. In other words, surfaces are arranged in a way so that no force fraction (vectorial force) is generated which could tend to move the movable valve part in an opening and/or closing direction. Instead, in general only forces are occurring, being perpendicular to said moving direction of said movable valve part. These forces, however, can be handled by immovable parts of the fluid flux regulating unit and are therefore not generating any opening and/or closing movement. Of course, a combination of the avoidance of forces, being parallel to the moving direction of the movable valve part and the balancing of such forces by counteracting forces is possible. This combination of both approaches can lead to even better results.

It is possible that said movable valve part comprises tapered surfaces on surface parts, particularly on surface parts being in fluid communication with said second fluid port. Using such tapered surfaces, the fluid flow resistance of the resulting fluid flux regulating unit can normally be further reduced. Also, it is often possible to reduce vibrations and/or generated noise. Also, by providing tapered surfaces, it is possible to provide sharp edges, which can be used for providing particularly leakage proof valve arrangements. If the tapered surfaces are arranged in fluid communication with said second fluid port, the resulting surface part will normally not be influenced by varying pressure on the first fluid port side. In particular, the tapered surface can be provided on the inner side of the tubular valve part, pointing towards the valve seat of the valve member.

It is also possible, to provide said movable valve part with balanced surfaces on surface parts, which are in fluid communication with said second fluid port. The balancing principle can be—as previously explained—based on avoiding pressure induced forces in the direction of movement of the movable valve part and/or based on creating counteracting pressure induced forces, being in parallel to the moving direction of the movable valve part. Using such a design it is possible, for example, to provide a fluid flux regulating unit which is independent or less dependent on the pressure at the second fluid port side of the fluid flux regulating unit.

It is possible to design and arrange said fluid flux regulating unit as a fluid pressure regulator. Particularly for pressure regulators it is important to be relatively independent of the pressure on the high pressure side (first fluid port; fluid inlet port) of the fluid flux regulating unit. However, fluid pressure regulators are usually highly dependent on the pressure on the low pressure side (second fluid port side; fluid outlet port) of the fluid flux regulating unit.

It is also possible to design and arrange the fluid flux regulating unit as an actuated valve. For such valves, it is usually desired that the valve can be actuated with a constant force, being independent of the fluid pressure on the fluid inlet side (first fluid port) and/or on the fluid outlet side (second fluid port). Therefore, the suggested design of the fluid flux regulating unit can be highly advantageous.

The fluid flux regulating unit can be provided with pilot pressure applying means, which preferably can be selectively connected to said first fluid port and/or said second fluid port. This way, the resulting unit can be changed, using fluid pressures. In particular it is even possible to change the state of the fluid flux regulating unit by the pressures, occurring in the fluid to be influenced by the fluid flux regulating unit. Of course, it is possible to form a switching of the pilot pressure actuated fluid flux regulating unit, using a different switching means. The switching means can be based on the fluid pressure, mechanical forces, electricity, magnetic forces and the like, for example.

A particular useful design can be achieved, if said pilot pressure applying means can be connected to a respective fluid pressure reservoir via a fluid throughput reducing means. Such a fluid throughput reducing means can be a throttle or an orifice opening, for example. Using such a device, the "consumption" of the actuating fluid can be advantageously decreased. Furthermore, it possible to provide for a "soft" changeover between different states of the valve unit, which can result in decreased wear of the fluid flux regulating unit.

It is also possible to provide at least one valve closing biasing means, which preferably biases said movable valve part in the direction of a closing position. With such a valve closing biasing means, it is possible, to provide for a secure closing of the fluid flux regulating unit in case the fluid flux regulating unit (or the device in which the fluid flux regulating unit is used) is not in use or at a residual pressure level. This way, it is possible to avoid the need for a separate shut off valve, for example. The valve closing biasing means can be made of an elastically deformable material. In particular, a spring can be used. The spring is preferably a metal spring and/or a helically wound spring.

It is possible to provide the fluid flux regulating unit with at least a third fluid port. This way it is possible to provide a changeover valve or the like with the previously described features and advantages.

Preferably, the fluid flux regulating unit can be of an in-line type design. Using such an in-line type design, the number and size of deflections for the fluid stream, flowing through the fluid flux regulating unit can be decreased. This way, vibrations can be reduced and the pressure drop along the fluid flux regulating unit can be decreased, for example. Also, usually less movable parts are necessary in the design of the fluid flux regulating unit.

The object of the invention is also solved by a fluid flux regulating unit, comprising a first fluid port, a second fluid port and a valve means, wherein said fluid flux regulating unit is designed and arranged in a way that said valve means is at least in part influenced by the fluid, which is controlled by the fluid flux regulating unit. This way, it is possible to use a cheap and efficient amplifying device and/or energy source for moving the valve means. In particular, a small influencing force can be amplified by the energy, stored in the fluid pressure of the fluid, which is controlled by the fluid flux regulating unit, so that even a relatively large and/or heavy valve means can be moved by a small initial force. Because in fluid regulators and/or fluid valves a pressure drop along the fluid flux regulating unit is normally not problematic (or even desired), this suggested design can prove to be particularly useful. This is, because pressure differences for driving the valve means in both directions are usually already present.

By the term "fluid", liquids (like liquid $CO_2$, for example), gases, mixture of gases and liquids and hypercritical fluids are in encompassed. It is also possible that the respective fluid can contain solid particles to a certain extent (e.g. smoke, suspensions).

BRIEF DESCRIPTION OF THE DRAWINGS

The present invention and its advantageous will become more apparent, when looking at the following description of possible embodiments of the invention, which will be described with reference to the accompanying figures, which are showing.

DETAILED DESCRIPTION OF THE PREFERRED EMBODIMENTS

Figure 1:
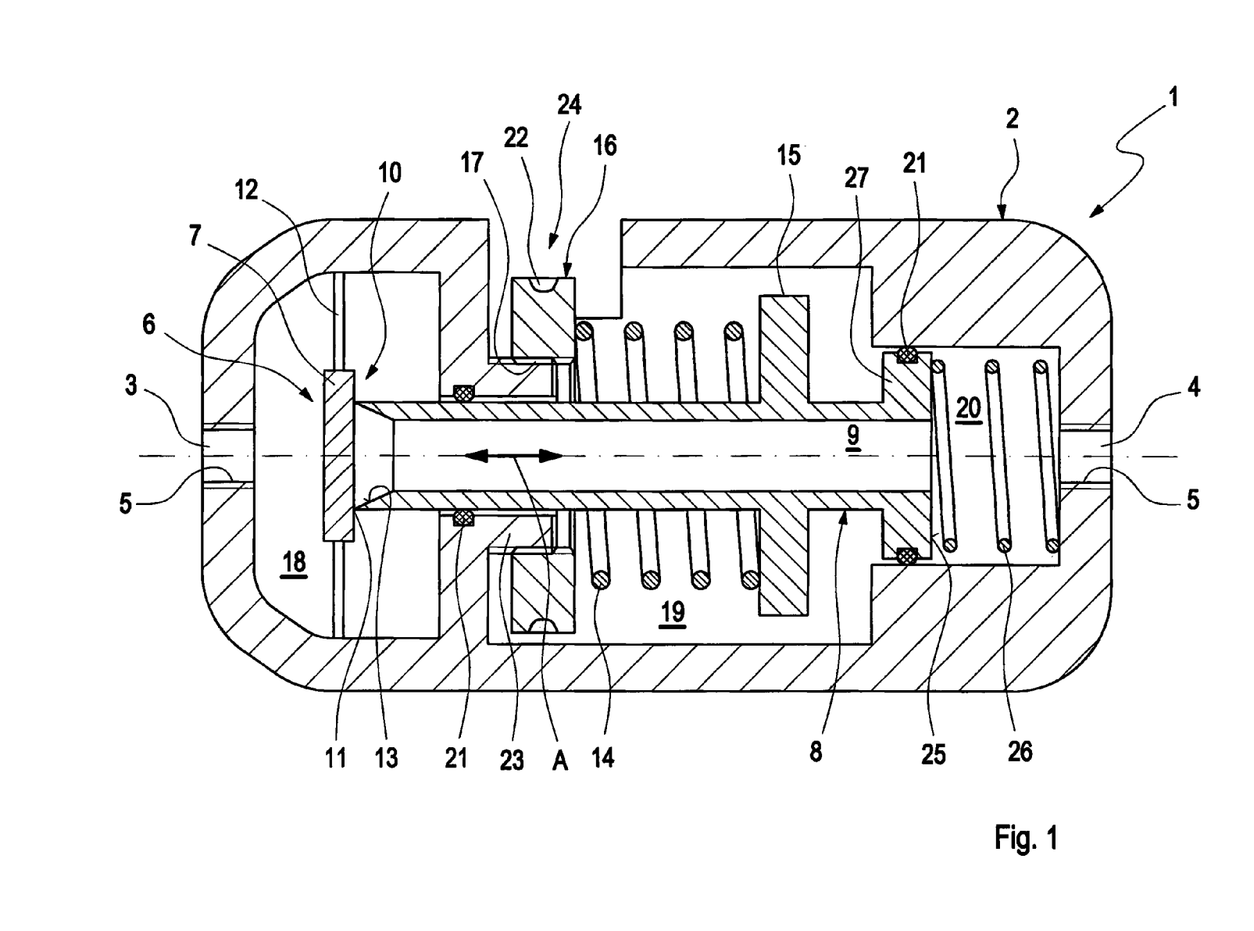
FIG. 1: is a first embodiment of a fluid pressure regulator.

In FIG. 1, a schematical cross section through a first possible embodiment of a pressure regulator 1 is depicted. The pressure regulator 1 comprises a casing 2 with a fluid inlet port 3 and a fluid outlet port 4. Both fluid inlet port 3 and fluid outlet port 4 have an inner thread 5, so that a corresponding fluid pipe or fluid hose can be threadingly engaged in the respective fluid port 3, 4.

Within the casing 2 of the pressure regulator 1, a valve unit 6 is arranged. The valve unit 6 essentially consists of a valve seat 7 and a valve tube 8. The valve tube 8 can be moved in an axial direction (as indicated by double-headed arrow A) within the casing 2 of the pressure regulator 1.

The valve tube 8 is designed to have a hollow interior 9, forming an inner fluid line 9 through the valve tube 8. The contacting area between valve seat 7 and valve tube 8 forms the valve opening 10. If the valve tube 8 is in its leftmost position (as drawn in FIG. 1), the valve seat 7 and the contacting edge 11 of the valve tube 8 contact each other, thus closing the valve opening 10. In this position, no fluid flow is permitted between fluid inlet port 3 and fluid outlet port 4. When the valve tube 8 is moving to the right, however, the contacting edge 11 of the valve tube 8 and the valve seat 7 get out of contact from each other, thus opening the valve opening 10. Hence, fluid can flow from the fluid inlet port 3 to the fluid outlet port 4.

In the embodiment of the pressure regulator 1, shown in FIG. 1, the valve seat 7 is designed as a flat, circular plate. The valve seat 7 is held in place by several holding bars 12. Between the holding bars 12, openings are provided, so that fluid can pass through. Corresponding to the design of the valve seat 7, the valve tube 8 is designed to have a circular cross section. Consequently, the contacting edge 11 shows a circular cross section. In the area close to the valve opening 10, the valve tube 8 comprises tapered edges 13 on the inner side 9 of the valve tube 8, thus forming sharp contacting edges 11. The valve seat 7 is made of a slightly deformable material, so that the contacting edges 11 can slightly indentate the valve seat 7, thus forming a tight fluid seal.

In a normal working adjustment position (main spring 14 biased), the valve tube 8 is pushed out of contact with the valve seat 7 (thus opening the valve opening 10) by means of the main spring 14. The main spring 14 is supported on its right side (see FIG. 1) by a circular web 15 integrally formed with the valve tube 8. On the left side, the main spring 14 is supported by a nut 16. The nut 16 shows an inner thread 17, which is engaged to a corresponding thread, arranged on the outer side of a collar like extension 23 of the casing 2. By a turning action of the nut 16, the nut 16 can be displaced in an axial direction A by means of the thread 17. Therefore, the biasing force of main spring 14 can be adjusted to the appropriate amount. For ease of manipulation, the nut 16 is designed to have a plurality of openings 22 for insertion of a part of an appropriate tool. Also, the casing 2 of the pressure regulator 1 is designed with an access window 24 for easy manipulation of the nut 16. Hence, the second interior space 19 within the casing 2 of pressure regulator 1 shows ambient pressure. Therefore, sealing rings 21 are provided between first internal space 18, second internal space 19 and third internal space 20, respectively.

The working cycle of the pressure regulator 1 is as follows:

Initially, the valve tube 8 is in its open position (right side in FIG. 1; valve opening 10 is open). Fluid at high pressure enters the fluid inlet port 3 of the pressure regulator 1. The fluid flows through the first internal space 18, past the opened valve opening 10, through the inner fluid line 9 of valve tube 8 into the third internal space 20. According to an actual fluid flow demand, part of the fluid entering third internal space 20 leaves the casing 2 of the pressure regulator 1 by fluid outlet port 4. However, in an open position of the valve unit 6, a positive net fluid flow into the third internal space 20 occurs. Therefore, pressure builds up in the third internal space 20. With increasing pressure, an increasing force is exerted on the piston surface 25 of the valve tube 8. At some point, the net force, pushing the valve tube to the left exceeds the net force, pushing the valve tube 8 to the right. Thus, the valve opening 10 closes and the pressure within the third internal space 20 remains at its set level. If the pressure inside the third internal space 20 drops again due to fluid, leaving through fluid outlet port 4, the valve tube 8 will move slightly to the right, thus opening the valve opening 10 slightly. Hence, an equilibrium is achieved, so that the pressure in the third internal space 20 remains constant.

Apart from the pressure, exerted by the fluid within third internal space 20 onto the piston surface 25 of valve tube 8, an additional force is exerted by means of an auxiliary spring 26. The auxiliary spring 26 has a small spring constant, when compared to the spring constant of main spring 14. Thus, in a normal adjustment position of pressure regulator 1, the main spring 14 may easily compensate for the pressure, exerted by auxiliary spring 26. However, if the nut 16 is adjusted in a way that main spring 14 is (essentially) in an unbiased state, the force, exerted by auxiliary spring 26 is sufficient to safely close the valve unit 6 of the pressure regulator 1. Therefore, no additional valve is needed, although the functionality of a cut-off valve is implemented in the pressure regulator 1.

The closed position of the pressure regulator 1 (main spring 14 unbiased), is also advantageous for shipping the pressure regulator 1. In particular, normal vibrations during transportation of the pressure regulator 1 will not be able to open and close the valve unit 6 repetitively. Thus, a wear of the pressure regulator 1 during transportation can be avoided.

Another feature of the pressure regulator 1, shown in FIG. 1, is that the axially movable valve tube 8 shows no surface parts within the first internal space 18 (high pressure chamber), which have to be balanced. If a fluid pressure is present in first internal space 18, every surface of the valve tube 8, being in contact with the high pressure fluid in first internal space 18 shows a surface normal, being solely perpendicular to the moving direction of the valve tube 8. Therefore, any pressure within first internal space 18 will neither generate force, urging the valve tube 8 in an opening direction, nor generate a force, urging the valve tube 8 in a closing direction. Therefore, the high pressure part of pressure regulator 1 is perfectly balanced, even without balancing surfaces.

On the inner side of the valve tube 8 in the vicinity of the valve opening 10, the movable valve tube 8 shows a tapered surface 13, creating a sharp edge 11. This way, fluid resistance is reduced, if the valve opening 10 is open. Also, a tight seal can be provided if the valve opening 10 is closed. It has to be noted that the tapered part 13 of the valve tube 8 is additionally working as a balancing surface for the respective surface part of the piston surface 25 of the valve tube 8 (both fluidly connected to the fluid outlet port 4). However, in the presently depicted embodiment of FIG. 1, the pressure regulator 1 is still dependent on the fluid outlet pressure, because a flange part 27 is provided for the valve tube 8, showing a cross section, exceeding the cross section of tapered surface parts 13.

Figure 3:
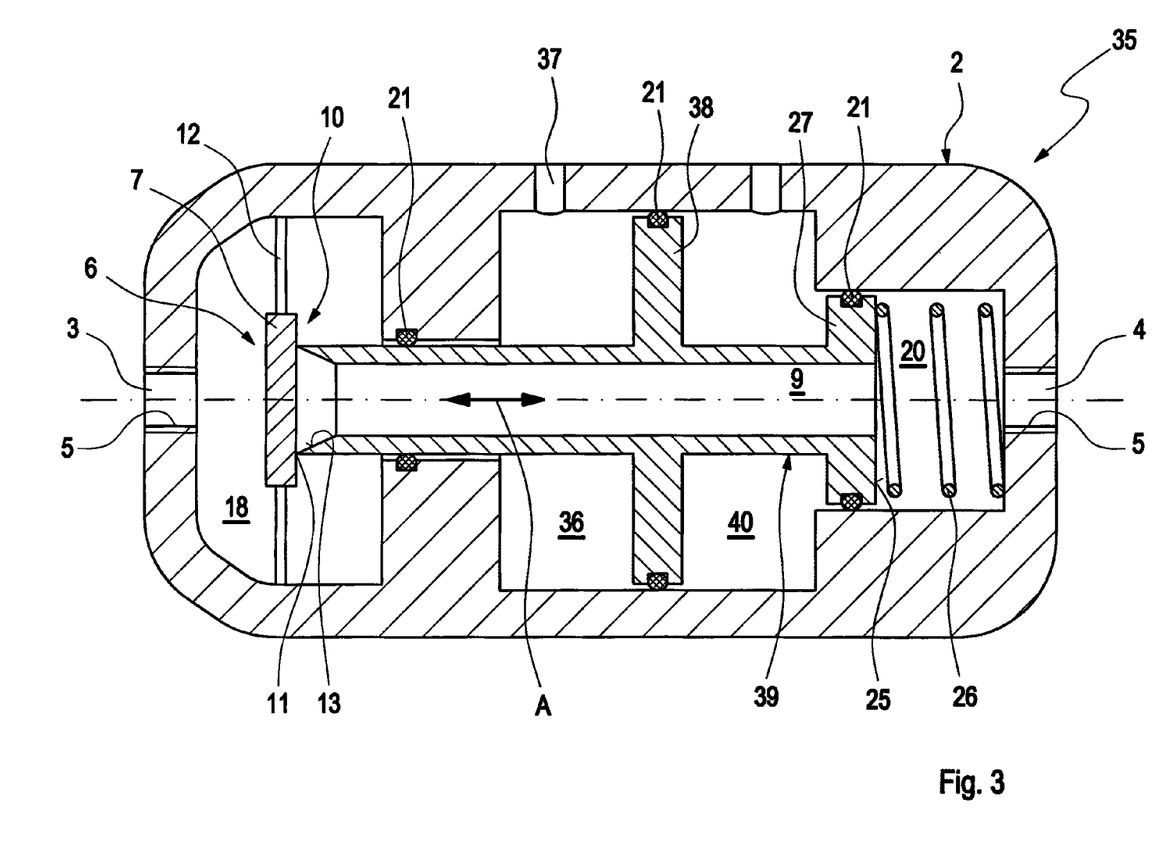
FIG. 3: is a first embodiment of an actuated valve.

The special design of the tapered surface 13 on the inner side 9 of the valve tube 8 in the vicinity of the valve opening 10 insures that the pressure drop of the fluid, flowing through the pressure regulator 1 will essentially occur in a very small area. Therefore, this construction can be less effected by variations in the pressure within first internal space 18. This is, because the areas, being in contact with the high pressure fluid are extremely small as compared to the areas, being in contact with the low pressure fluid. The auxiliary spring 26 can put the pressure regulator 1 in a shut off state, if there is no load on the main spring 14 (or on the flange part 38 of valve tube 8 in the pressure regulator 35, as shown in FIG. 3). Hence, the fluid regulator 1 described can work as a shut off valve as well.

Of course, it is also possible to design the flange part 27 in a different way, as long as the described functionality of the flange part 27 is provided. For example, the flange part 27 could be designed as a membrane for the like. Of course, such an alternative design could be used in units of a different design as well.

Figure 2:
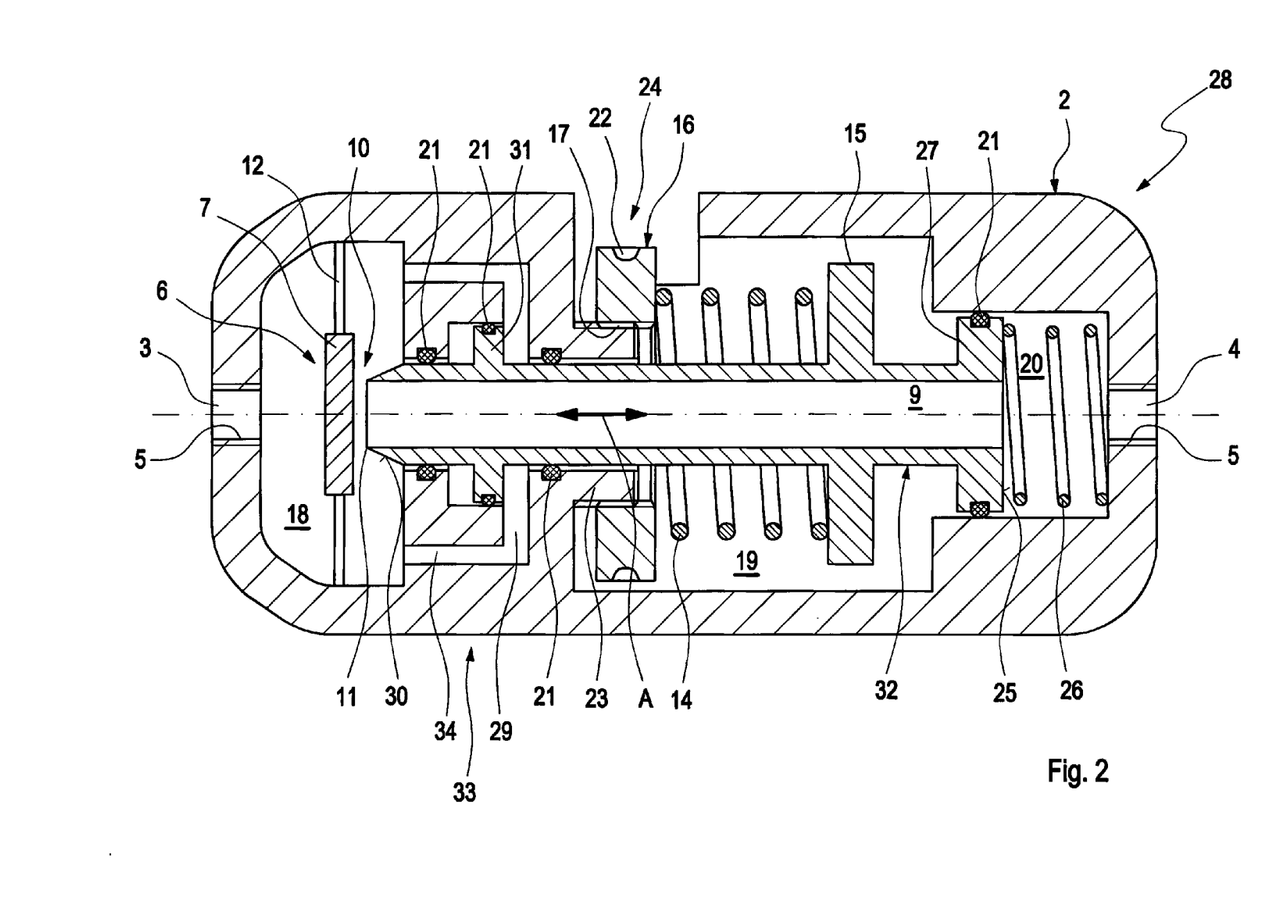
FIG. 2: is a second embodiment of a fluid pressure regulator.

In FIG. 2, a second possible embodiment of a pressure regular 28 is shown. Most parts of the present pressure regulator 28 are similar or the same as those used for pressure regulator 1, as illustrated in FIG. 1.

As described in connection with first pressure regulator 1, the presently used valve tube 32 comprises a tapered surface 30 in the vicinity of the valve seat 7. The tapered surface 30, however, is presently arranged on the outside of the valve tube 32, thus facing towards the first internal space 18, being fluidly connected to the fluid inlet port 3 of pressure regulator 28. This, however, introduces a force, urging the valve tube 32 into an opening direction, when high pressure is applied to the first internal space 18. The effective opening force is the vectorial fraction of the pressure force, pointing in the direction of movement of valve tube 32. To balance for this force, the pressure regulator 28 is provided with a balancing section 33. Within the balancing section 33, the fourth internal space 29 is provided, which is fluidly connected to the first internal space 18 by a fluid channel 34. Facing towards the fourth internal space 29, the valve tube 32 is provided with a balancing web 31. The size of the balancing web 31 is chosen in a way that the resulting force, being exerted onto the valve tube 32 when pressure is applied to fluid inlet port 3 (and therefore to first internal space 18 and fourth internal space 29) is of the same magnitude as the force generated by the tapered surface 30. The direction of both forces, however, is opposite to each other. Therefore, both forces cancel each other. Thus, the pressure regulator 28 is balanced towards the high pressure side. In other words, the output pressure characteristics of the pressure regulator 28 is independent of the pressure at fluid inlet port 3.

An advantage of the proposed design with the tapered surface 30 on the outside of the valve tube 32 is that the dimensions of the fluid tube 32 can be chosen from a very wide range. This is, because generally speaking an almost arbitrary size of the surface area on the front side of the valve tube 32 (near valve opening 10) can be compensated by the counteracting force delivered by the ring like web 31 of valve tube 32. Thus, a pressure regulator 28 of the design proposed can be used with very high pressures.

As an example, the thickness of the walls of the valve tube 8, 32 is normally in the order of one millimeter (pressures in the range from 200 to 300 bars). However, with the proposed design, wall thicknesses for the valve tube 8, 32 in the area of several millimeters can be easily realized.

Figure 4:
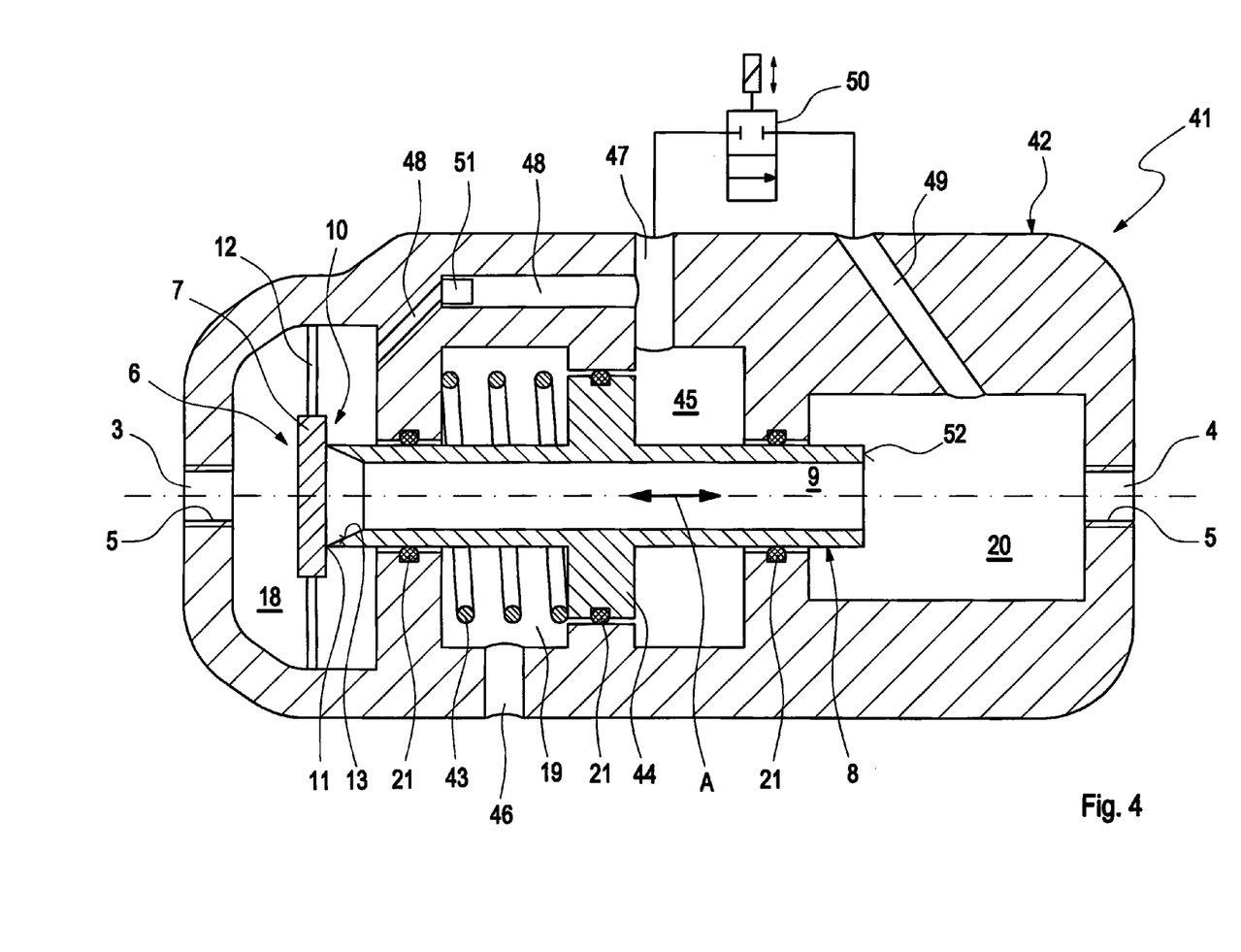
FIG. 4: is a second embodiment of an actuated valve.
Figure 5:
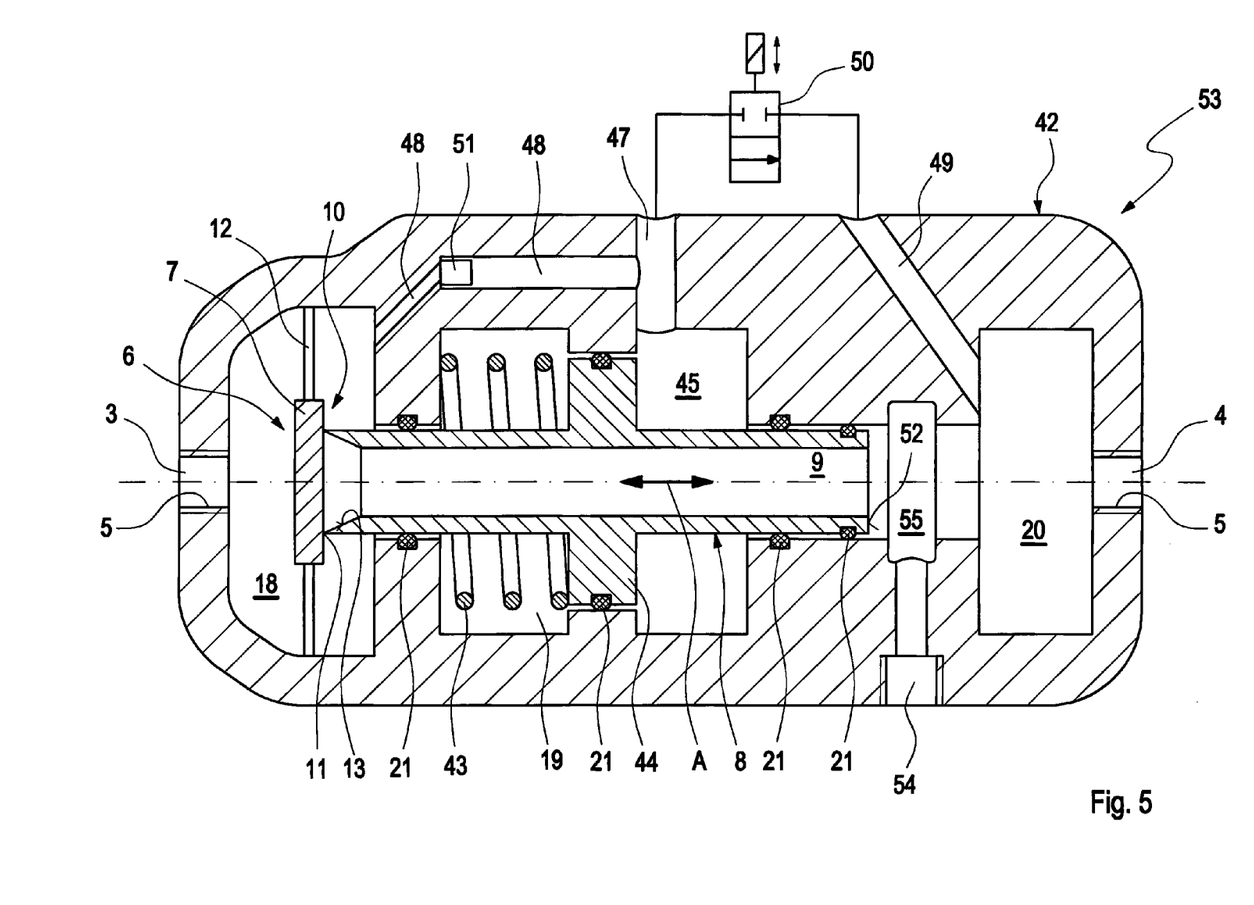
FIG. 5: is a third embodiment of an actuated valve.

Of course, the design of the pressure regulator 28, as shown in FIG. 2, can be used for the design of a pilot driven valve 41, 53 as well (see FIGS. 4, 5). In particular, the arrangement of the tapered surface 30 on the outside of valve tube 32 can be used for pilot driven valves 41, 53. Of course, the tapered surface 30 on the outside of the valve tube 32 can also be used in connection with the pilot driven 37 fluid pressure regulator 35 design, as depicted in FIG. 3.

In FIG. 3 another possible embodiment of a pressure regulator 35 is illustrated. Here, the main spring 14 is omitted. As a replacement for the main spring 14, a pilot pressure chamber 36 is provided. The pilot pressure chamber 36 is fluidly connected to a pilot fluid port 37. On one side of the pilot pressure chamber 36, a flange part 38 of the valve tube 39 is located. Therefore, by applying a pressure to the pilot pressure chamber 36, an appropriate biasing force can be exerted on the valve tube 39. The biasing can be changed by varying the pressure, applied to the pilot pressure chamber 36. It has to be noted that this way an automated change of biasing force can be easily implemented. The backside volume 40 is of course at ambient pressure.

Apart from this, the pressure regulator 35, as depicted in FIG. 3, resembles the pressure regulator 1, as shown in FIG. 1.

In FIG. 4, a first possible embodiment of a pilot driven valve 41 is shown. The pilot driven valve 41 resembles the pressure regulators 1, 28, 35, shown in FIGS. 1, 2 and 3 in several aspects.

The casing 42 has a fluid inlet port 3 and a fluid outlet port 4, both showing a female thread 5 for threadingly connecting a fluid pipe or fluid hose with a corresponding outer thread. Similar to the pressure regulators 1, 28, 35, the valve unit 6 comprises a circular plate shaped valve seat 7, held in place by holding bars 12 inside the first internal space 18 of the pilot-driven valve 41. Furthermore, the valve unit 6 comprises a valve tube 8, showing a hollow interior 9, thus forming an inner fluid line 9. The valve tube 8 is axially movable in the direction of double-headed arrow A within the casing 42.

The valve tube 8 comprises a collar-like sleeve 44. The collar-like sleeve 44 can be integrally formed with the valve tube 8.

In a second internal space 19, an opening spring 43 is provided. The opening spring 43 is compressed and touches part of the casing 42 (left side in FIG. 4) and part of the collar-like sleeve 44 of the valve tube 8 (right side in FIG. 4). The opening spring 43 is in a biased state and therefore opening spring 43 exerts a force on the valve tube 8 in the opening direction of valve tube 8 (in FIG. 4 on the right side). The second internal space 19 is connected through the outside via a pressure relief channel 46. Therefore, second internal 19 is under ambient pressure.

On the other side of the collar-like sleeve 44, a pilot pressure chamber 45 is arranged within casing 42. If pilot pressure chamber 45 is vented (ambient pressure or low pressure), the force, exerted by opening spring 43 will prevail, thus moving the valve tube 8 to the right side and opening valve 10. If, however, the pressure in the pilot pressure chamber 45 exceeds a certain limit, the force, exerted by the pressure within pilot pressure chamber 45 will prevail over the force exerted by opening spring 43, thus moving valve tube 8 to the left and hence closing valve opening 10. For this, a fluid connection between first internal space 18 and pilot pressure chamber 45 can be established via feeding line 48 and connecting line 47. This way, fluid inlet port 3 can be connected via first internal space 18, valve opening 10, inner-fluid line 9 of valve tube 8, third internal space 22 to the fluid outlet port 4, or the fluid connection can be closed, according to the pressure level within pilot pressure chamber 45.

For switching the pilot driven valve 41, a piloting valve 50 is provided in the presently depicted embodiment. The piloting valve 50 can be driven by electromagnetic forces, for example. If the piloting valve 50 is in its closed position (as shown in FIG. 4) the connecting line 47, leading to pilot pressure chamber 45, and the discharge line 49 are separated from each other. Therefore, feeding line 48, connects the first internal space 18 under high pressure to the pilot pressure chamber 45 via connecting line 47. Therefore, pressure builds up in pilot pressure chamber 45, and the valve unit 6 will eventually moves to its closed position. Within feeding line 48, a throttling device 51 is arranged. The fluid flux from first internal space 18 to pilot pressure chamber 45 is therefore reduced to a relatively small level.

If the piloting valve 50 is switched to its open position, the pilot pressure chamber 45 is vented via connecting line 47, piloting valve 50 and discharge line 49 and third internal space 20 to the fluid outlet port 4. Therefore, the pressure in the pilot pressure chamber 45 will decrease and at some point the valve tube 8 will move to the right side, thus opening valve opening 10. It has to be remembered, that within feeding line 48, a throttling device 51 is arranged. Therefore, the fluid flow through discharging line 49 can easily outweigh the fluid flow through feeding line 48. The more limiting the throttling device 51 is, the lower are the fluid loses through feeding line 48. On the other hand, a limited fluid flow through throttling device 51 will slow down the closing movement of pilot driven valve 41.

It has to be mentioned that in the closed position of pilot driven valve 41, piloting valve 50 is also closed, and therefore a fluid flow through discharging line 49 is stopped, including the piloting part of pilot driven valve 41. Therefore, pilot driven valve 41 will be completely closed in its closed state, when considered together with the piloting valve 50.

Of course, piloting valve 50 can be designed differently as well. For example, a manual operation of piloting valve 50 is possible. Also, piloting valve 50 can be constructed in a way that intermediary states can be achieved. This can be achieved by providing an intermediary mechanical position of the piloting valve 50. However, a proportional valve is possible as well. This could be achieved by a modulated magnetic valve, for example.

As already described in connection with the pressure regulators 1, 36, shown in FIGS. 1 and 3, a tapered surface 13 is provided on the inside 9 of valve tube 8. Consequently, no tapered surface is present on the outside of valve tube 8 within first internal space 18. Therefore, no balancing surfaces with respect to the high pressure in first internal space 18 have to be provided, because the pilot driven valve 41 is already balanced by its basic design, when considering the high pressure side 18 of the pilot driven valve 41.

Considering the low pressure part 20 of the pilot driven valve 41, the tapered surface 13, provided on the inner side of fluid line 9 of the valve tube 8 will result in a vectorial fractional force, directed in the opening direction of valve unit 6, if a (low) pressure is present on the low pressure side 20. However, the end surface 52 of the valve tube 8 is fluidly connected to the third internal space 20, being on the low pressure level as well. The size of the end surface 52 corresponds to the cross-sectional area of hollow valve tube 8. Because vectorial fractions have to be considered, the force, being exerted to the valve tube 8 via end surface 52, when the low pressure side 4 is pressurized, is equivalent to the pressure being exerted to the valve tube 8 by the tapered surface 13 in magnitude. However, the directions of two forces are opposite to each other. Thus, the two forces cancel each other.

Of course, sealing rings 21 are provided between first internal space 18, second internal space 19, pilot pressure chamber 45, and third internal space 20, respectively.

In case that very high pressures (at or above 200 bars, 300 bars or even higher) are present at the fluid inlet port 3, it is even possible to omit main spring 43. This is because independent of the tapered surface 13, being arranged on the inside of valve tube 8, a relatively small residual force, tending to move the valve tube 8 in the open position of valve unit 6, can usually not be completely avoided. This design is even possible in connection with the embodiment shown in FIG. 5. However, the design with main spring 43 is preferred, in particular with respect to a 3/2 valve, as shown in FIG. 5, because in that case a clear positioning of valve tube 8 is clearly preferred.

In FIG. 5, a second possible embodiment of a pilot driven valve 53 is shown. Pilot driven valve 53 is of a 3/2 type, i.e. three fluid connections are provided, and states of the pilot pressure valve 53 are provided. The pilot pressure valve 53 is very similar to the pilot driven valve 41, shown in FIG. 4. However, a third fluid port 54 is provided.

The third fluid port 54 connects to a ring chamber 55, surrounding the moving path A of the valve tube 8. The ring chamber 55 and the length of the valve tube 8 (i.e. the position of the end surface 52 of valve tube 8) are arranged in a way that third fluid port 54 connects to the third internal space 20, if the valve unit 6 is in its closed state. Therefore, third fluid port 54 and fluid outlet port 4 are connected to each other. However, neither fluid outlet port 4, nor third fluid port 54 is connected to the fluid inlet port 3.

However, if the pilot driven valve 53 is in its fully open position, the part of the valve tube 8 near the end surface 52 completely covers the ring chamber 55. Therefore, the third fluid port 54 is cut off from the third internal space 20. However, fluid inlet port 3 and fluid outlet port 4 are fluidly connected to each other.

Of course, intermediary states are also possible for the pilot driven valve 53.

Figure 6:
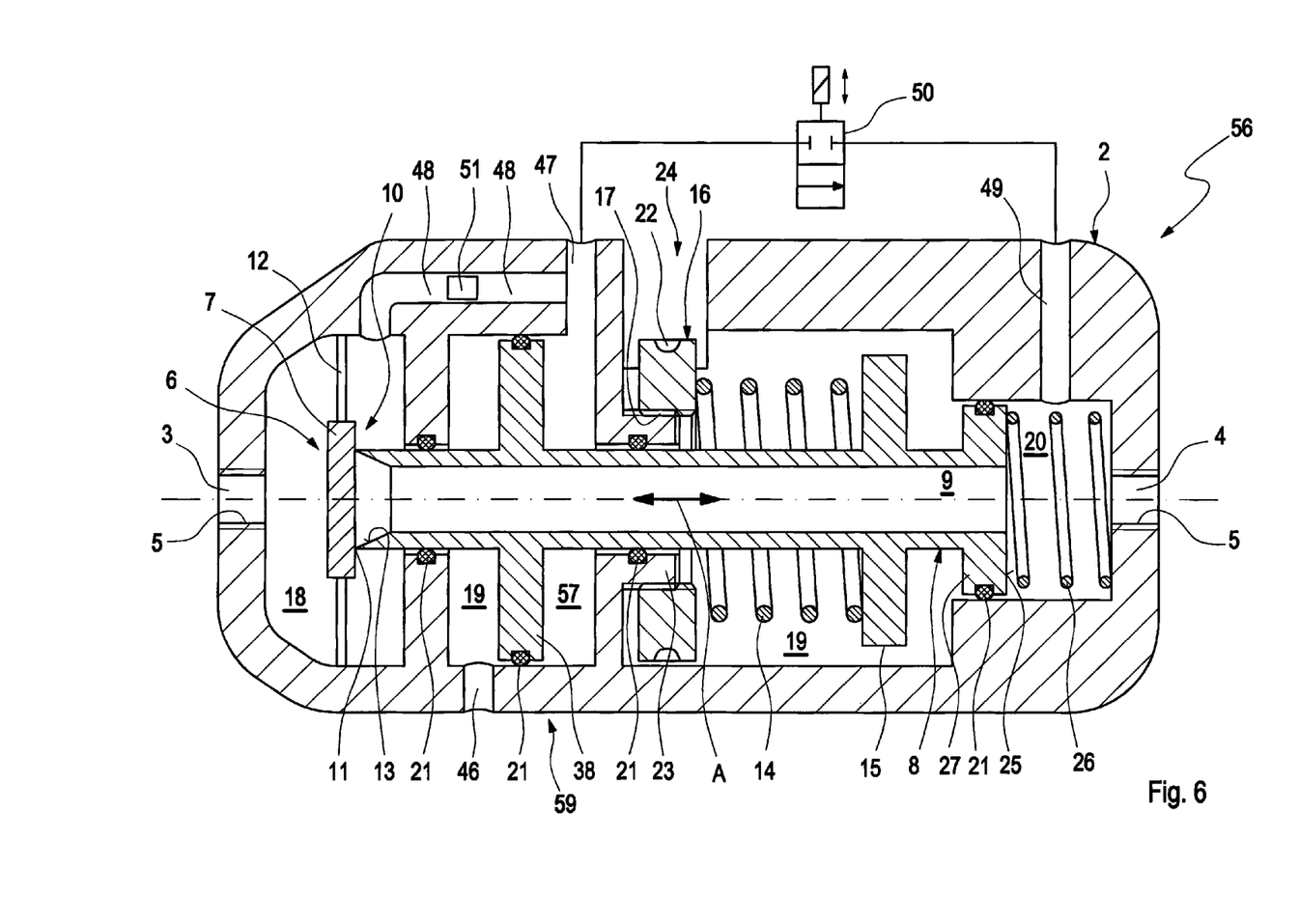
FIG. 6: is a third embodiment of a fluid pressure regulator.

In FIG. 6, a pilot controlled fluid pressure regulator 56 is depicted. The pilot controlled fluid pressure regulator 56, combines the features of the pressure regulators 1, 28, 35, shown in FIGS. 1,2 and 3 and the pilot driven valves 41, 53, shown in FIGS. 4 and 5.

More precisely, the pressure controlled fluid pressure regulator 56 can be considered to be a fluid pressure regulator 1, as shown in FIG. 1, in which a pilot control section 33, comprising an additional closing chamber 57 is provided. The closing chamber 57 is fluidly connected to the first internal space 18 via a feeding line 48 and a connecting line 47. The fluid flux through the feeding line 48 is limited by a throttle 51, which can be formed as a part of the feeding line 48. If the piloting valve 50 is in its closed position (as shown in FIG. 6), the pressure in the closing chamber 57 will eventually be the same as the pressure in the first internal space 18. Therefore, the pressure of the fluid in closing chamber 57 exerts a force on the flange part 38 of valve tube 8. This will cause the valve tube 8 to move to the left side, i.e. pushing the valve tube 8 on the valve seat 7, thus closing the valve unit 6. Therefore, the pilot controlled fluid pressure regulator 56 can be safely closed, irrespective of the fluid pressure in third internal space 20, i.e. irrespective of the fluid pressure at the fluid outlet port 4. Of course, the second internal space 19, lying on the flange part 38 of the valve tube 8, which is opposite to the closing chamber 57, is vented to ambient pressure via channel 46.

If the piloting valve 50 is switched to its open position, however, a fluid connection is established between connecting line 47 and third internal space 20 via piloting valve 50 and discharge line 49. Therefore, the pressure in the closing chamber 57 will drop to the pressure level of third internal space 20. This is, because the influx of fluid is limited by throttle 51. Because of the falling pressure within closing chamber 57, the valve tube 8 is now again free to move to the right side, i.e. into the open position of valve unit 6. Whether this movement will actually take place, or not, depends on the pressure in third internal space 20. Therefore, the pilot controlled fluid pressure regulator 56 now works as a standard fluid pressure regulator.

Figure 7:
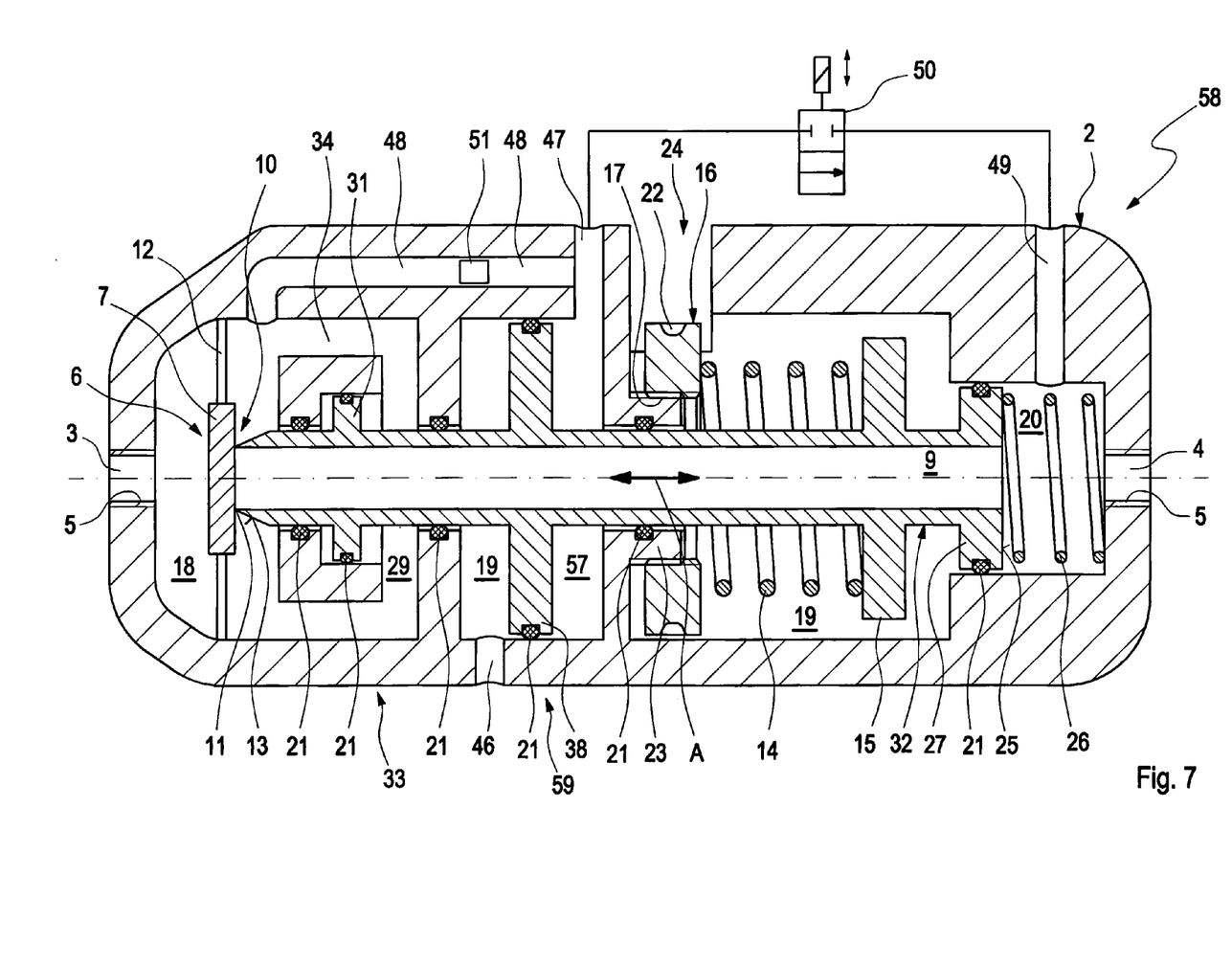
FIG. 7: is a fourth embodiment of a fluid pressure regulator.

FIG. 7 is a modification of the pilot controlled fluid pressure regulator 56, shown in FIG. 6. The presently shown pilot controlled fluid pressure regulator 58 shows an additional balancing section 33, which is equivalent to the balancing section 33 of the pressure regulator 28, shown in FIG. 2. In other words, the fluid pressure regulator 28, shown in FIG. 2, can be modified by providing a pilot control section 59. This way, a pilot controlled fluid regulator 58, which is fluid pressure regulated (in particular towards the high pressure side of the pilot controlled fluid pressure regulator), can be realised.

Further information can be drawn from the application, which was filed by the same applicant on the same date under applicant's reference number DAN08004PE. The disclosure of said application is fully integrated into the disclosure of the present application by reference.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A fluid flux regulating unit, comprising:
   a casing defining:
      a first fluid port;
      a second fluid port;
      a fluid passage; and
      an internal space;
   a valve comprising a movable valve part comprising a tubular wall defining an inner passage along an axial length of the tubular wall, said movable valve part comprising at least one fluid pressure balancing means, said at least one fluid pressure balancing means comprising a tapered surface disposed on the tubular wall such that the tapered surface is surrounding the inner passage;
   wherein said fluid pressure balancing means comprises a surface disposed in the internal space, which is in fluid communication with said first fluid port via the fluid passage, wherein at least part of the surface has a surface normal vector in parallel to the moving direction of said movable valve part and is configured to be pressure balanced;
   wherein the first fluid port is in fluid communication with the second fluid port via the inner passage, and the first fluid port is separately in fluid communication with the internal space via the fluid passage;
   wherein said tapered surface is closer to said first fluid port than said part of the surface having a surface normal vector in parallel to the moving direction of said movable valve part is to said first fluid port; and wherein the tapered surface is fluidly connected to the first fluid port independently of the position of the movable valve part.

2. The fluid flux regulating unit as claimed in claim 1, wherein a force is generated on the fluid pressure balancing means by the fluid pressure from the first fluid port in a direction parallel to the moving direction of said movable valve part.

3. The fluid flux regulating unit as claimed in claim 1, wherein said fluid flux regulating unit is designed and arranged as a fluid pressure regulator.

4. The fluid flux regulating unit as claimed in claim 1, further comprising at least one valve biasing element is provided, which biases said movable valve part in the direction of a closing position.

5. The fluid flux regulating unit according to claim 1, wherein said valve is at least in part influenced by the fluid, which is controlled by the fluid flux regulating unit.

6. The fluid flux regulating unit according to claim 1, wherein said tubular wall comprises an inner surface and an outer surface, and wherein said tapered surface connects the inner surface to the outer surface to thereby form a tapered end of the tubular wall.

* * * * *